United States Patent

Mechtersheimer et al.

[11] Patent Number: 5,848,960
[45] Date of Patent: Dec. 15, 1998

[54] PROCESS FOR VITRIFYING RESIDUES FROM FLUE GAS CLEANING

[75] Inventors: Günter Mechtersheimer, Brugg; Christian Wieckert, Seon, both of Switzerland

[73] Assignee: ABB Research Ltd., Zurich, Switzerland

[21] Appl. No.: 786,343

[22] Filed: Jan. 23, 1997

[30] Foreign Application Priority Data

Jan. 31, 1996 [DE] Germany ............. 196 03 365.9

[51] Int. Cl.⁶ .................................................. B09B 3/00
[52] U.S. Cl. .................. 588/252; 65/134.8; 588/248; 405/128
[58] Field of Search .................. 405/128, 129; 588/252, 256, 248; 65/134.8

[56] References Cited

U.S. PATENT DOCUMENTS

| | | | |
|---|---|---|---|
| 4,666,490 | 5/1987 | Drake | 588/256 |
| 5,092,929 | 3/1992 | Sauer et al. | 405/128 X |
| 5,367,116 | 11/1994 | Frey | 588/252 |
| 5,405,590 | 4/1995 | Macedo | 588/205 X |
| 5,430,236 | 7/1995 | de Macedo | 588/256 X |
| 5,613,241 | 3/1997 | Forsberg | 588/252 X |
| 5,616,160 | 4/1997 | Alexander et al. | 65/134.8 X |
| 5,716,316 | 2/1998 | Cartier et al. | 588/256 |

FOREIGN PATENT DOCUMENTS

| | | |
|---|---|---|
| 3830392A1 | 3/1990 | Germany . |
| 3841221A1 | 6/1990 | Germany . |
| 4222379A1 | 1/1994 | Germany . |
| 4340754A1 | 6/1995 | Germany . |

OTHER PUBLICATIONS

"Filterstaub verglasen und verwerten", J. Jochum, et al., ABB Technik Mar. 1991, pp. 29–34.

Primary Examiner—George A. Suchfield
Attorney, Agent, or Firm—Burns, Doane, Swecker & Mathis, L.L.P.

[57] ABSTRACT

To vitrify chlorine-containing residues from flue gas cleaning, in particular filter dust and residues from the flue gas scrubber, the residues are melted in a melting furnace (8) and then discharged. To condition the melt, alkali-containing fluxes are added in the form of an oxide, hydroxide or carbonate, the stoichiometric ratio between the total alkalis and the chlorine being greater than 0.75, preferably greater than 1. Particularly suitable compounds in this process are oxides, hydroxides or carbonates of sodium or of potassium, or a mixture of such substances.

7 Claims, 1 Drawing Sheet

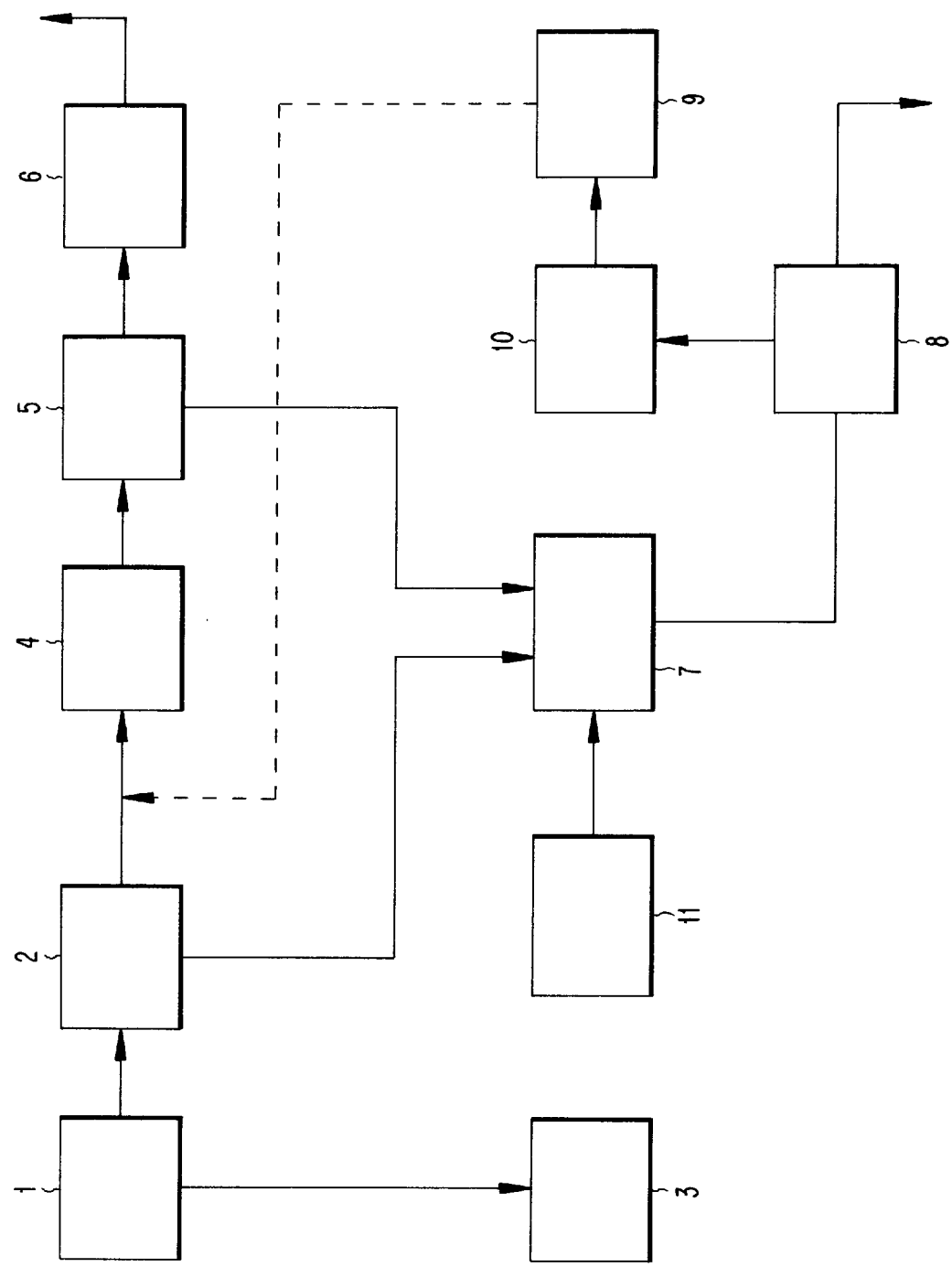

PROCESS FOR VITRIFYING RESIDUES FROM FLUE GAS CLEANING

BACKGROUND OF THE INVENTION

1. Field of the Invention

The invention relates to a process for vitrifying chlorine-containing residues from flue gas cleaning, in particular filter dust and residues from the flue gas scrubber, in which the residues are melted in a melting furnace and then discharged, fluxes being added to condition the melt.

A process of this generic type is disclosed by DE 43 40 754 A1.

2. Discussion of Background

In the known melting processes, filter dust and boiler ash are treated without fluxes in an electrically heated melting furnace at temperatures around 1300° C. The residues melt and are discharged from the furnace via a gas-tight siphon and are then cooled. This produces a vitreous residue which may be landfilled without problem. During the melting process, most of the heavy metal compounds vaporize. Organic pollutants such as dioxins or furans are thermally destroyed. Non-vaporizing high-boiling metal compounds are incorporated into the glass matrix, in a similar manner to lead in lead crystal glass. A fan downstream of the furnace ensures that the vaporized components are drawn out from the furnace.

This process has proved to be most useful in the vitrification of residues having a relatively low content of metal chlorides, metal sulfites and metal sulfates, as are typically present in filter dust.

In the course of exhaust gas cleaning, however, residues also arise which, in a majority of the plants, are disposed of together with the filter dust, in the present case are vitrified. Thus, to eliminate sulfur dioxide and hydrochloric acid, the exhaust gases are subjected to lime scrubbing, calcium compounds, in particular $CaSO_3$, $CaSO_4$ and $CaCl_2$, arising as byproducts which are to be melted and vitrified together with the filter ash. Typically, this mixture contains between 10 and 20% of chlorine, which is principally present in the form of $CaCl_2$. This calcium compound has a boiling point (>1600° C.) far above the conventional operating temperatures. This means that precisely these chlorides cannot be converted to the vapor phase. At the same time, only a small proportion of chlorine can be incorporated into the glass matrix. It is a further disadvantage that a growing salt layer forms on the surface of the melt, which salt layer significantly restricts the necessary vaporizing of the volatile heavy metal compounds and, furthermore, has a highly corrosive action on the furnace bricks.

An increase in operating temperature to markedly above 1500° C. for accelerated vaporization of the $CaCl_2$ is hardly advantageous for economic reasons, especially since great material problems (temperature stability of the furnace construction, corrosion) arise. The prior washing of the mixture of filter ash and residues from the lime scrubbing with water to reduce the chlorine content is also not very expedient, because it creates a wastewater problem. Furthermore, the mixture, prior to entry into the melting furnace, would have to be dewatered again, which would require additional use of equipment and energy.

SUMMARY OF THE INVENTION

Accordingly, one object of the invention is to provide a novel process for vitrifying high-chlorine-content residues from flue gas cleaning which enables substantial conversion of the chlorine to the vapor phase at comparatively low process temperatures.

This object is achieved according to the invention by adding an alkaline flux in the form of an oxide, hydroxide or carbonate to the residues to convert the chlorine to the vapor phase, the stoichiometric ratio between the total alkalis and the chlorine being greater than 0.75, preferably greater than 1. Preferably, use is made in this process of oxides, hydroxides or carbonates of sodium or of potassium or a mixture of such substances.

The alkaline fluxes react with the calcium chloride in the melt forming alkali metal chlorides which vaporize in sufficient quantity at temperatures as low as below 1350° C. In the melt there remains a small amount of chlorine (typically 1–2% by weight) which is readily incorporated into the glass matrix, while the unreacted fluxes are taken off from the furnace in gaseous form as chlorides, and the calcium is incorporated into the glass matrix as CaO.

Optimizing glass formation by adding fluxes is known per se. Generally, these are substances having a high content of silicates (cf. DE 43 40 754 A1, page 4, lines 29 to 60). In said publication, furthermore, a number of other fluxes are proposed, e.g. residues, carbon-containing substances and mixtures, reaction products from flue gas cleaning and also residues which contain alkali metal chlorides or alkaline earth metal chlorides. These fluxes are said to promote evaporation of environmentally relevant heavy metals and thus separation of these metals from the glass matrix. There is no marked reduction in chlorine content. These fluxes are therefore suitable only for filter residues not having an elevated chlorine content.

In contrast, the process according to the invention concerns converting high-boiling metal chlorine compounds into lower-boiling chlorine-containing substances. The aim is to vaporize chlorine, to permit melting at lower temperatures without formation of a salt layer, in the case of filter dusts having an elevated chlorine content.

The proposed process enables vitrification of residues from flue gas cleaning having chlorine contents up to 20% and above at melting temperatures which have otherwise only been employed for classical filter dust.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein: in the single FIGURE, an illustrative example of the invention is shown in the form of a block flow diagram of a refuse incineration plant equipped with flue gas cleaning and a melting furnace.

DESCRIPTION OF THE PREFERRED EMBODIMENTS

Referring now to the drawing, in the single FIGURE, the refuse incineration plant shown which is equipped with dry flue gas cleaning comprises an incineration furnace 1 having a downstream boiler 2. The slag arising in the incineration is further treated in a slag conditioning station 3. On the exhaust gas side of the boiler 2 there is connected a reactor 4 into which lime is injected in the form of $Ca(OH)_2$. The acidic gases HCl and $SO_2$ present in the flue gas react with the lime to form $CaSO_3$ and $CaCl_2$, which are separated off together with the fly ash in the filter stage 5 typically having a bag filter. The exhaust gas treatment is completed by an (optional) denitration stage 6.

The boiler ash from the boiler 2 and the mixture of the filter dust and the byproduct from the flue gas cleaning from the filter stage 5 are passed via a mixing stage 7 to a melting furnace 8 and melted therein. The exhaust gas of the melting furnace 8 is drawn out of the melting furnace by means of a pump 9 and cooled (quenched) with cold air. As a result, the heavy metal compounds condense or desublimate from the gas and can be separated off in a downstream filter 10, e.g. a bag filter, and worked up later. The filtered air is optionally recycled to the reactor 4. The melt is taken off from the melting furnace 8 continuously or intermittently and granulated dry or by quenching in a water bath.

To this extent, refuse incineration plants are known and described, for example in the company publication ABB Technik, March 1991, pages 29–34, with this concerning the treatment of pure filter dust without admixture of flue gas cleaning products.

In order now to enable the vitrification of the melt even in the presence of high concentrations of metal chlorides at economic melt temperatures, the invention provides for adding alkali metal compounds in the form of oxides, hydroxides or carbonates in advance to the residues to be introduced into the melting furnace or at least in the melting furnace. For this purpose, an essentially chloride-free flux of this type is additionally fed from an alkali reservoir 11 to the mixing stage. In particular, for residues to be treated having a chlorine content between 10 and 20%, alkali metal oxides, alkali metal hydroxides or alkali metal carbonates are suitable for this purpose. The flux must be added in this process in such a manner that the stoichiometric ratio between the total alkalis and the chlorine is greater than 0.75, preferably greater than 1, in the mixture to be melted. These alkalis react with the calcium chloride ($CaCl_2$) in the melt to form alkali metal chlorides, which desublimate from the melt at temperatures as low as around 1300° to 1350° C., are taken off from the melting furnace and separated off in filter 10. In the melt there remains a comparatively small proportion of chlorine (typically 1 to 2% by weight), which is incorporated into the glass matrix.

In order that this process proceeds in an orderly manner, care must be taken to ensure that the partial pressure of the alkali metal chlorides released from the melt is kept low enough to obtain a satisfactory vaporization rate of the alkali metal chloride. This may be achieved by a sufficiently high exhaust gas flow rate. This should be at least 0.5 cubic meters (at standard temperature and pressure) per kg of molten residue. It is of importance for this process that sufficient amounts of alkali metal chlorides are drawn out from the furnace. The rate is determined by the partial pressure of the alkali metal chlorides and the amount of exhaust gas. In order to be able to remove the largest possible amount of alkali metal chlorides with as little exhaust gas as possible, it is advisable to set operating conditions at which the partial pressure is close to the saturation partial pressure. For a furnace temperature of 1350° C., it is typically advisable to guarantee an exhaust gas volume of at least approximately 0.5 cubic meters (at standard temperature and pressure) per kg of molten residue. The partial pressure of the alkalis in this process is typically of the order of magnitude of 0.1–0.2 bar.

By means of the process according to the invention it is thus possible to treat residue mixtures having an elevated or high chlorine content.

Obviously, numerous modifications and variations of the present invention are possible in the light of the above teachings. It is therefore to be understood that within the scope of the appended claims, the invention may be practiced otherwise than as specifically described herein.

LIST OF DESIGNATIONS

1 Incineration furnace
2 Boiler
3 Slag conditioning
4 Flue gas cleaning reactor
5 Filter stage
6 Denitration
7 Mixing stage
8 Melting furnace
9 Pump
10 Filter
11 Alkali reservoir

What is claimed as new and desired to be secured by Letters Patent of the United States is:

1. A process for vitrifying chlorine-containing residues from flue gas cleaning, said process comprising adding an alkaline flux in the form of an oxide, hydroxide, or carbonate to the residues at a total alkali to chlorine stoichiometric ratio of greater than 0.75 to convert the chlorine to the vapor phase.

2. The process according to claim 1, wherein said chlorine-containing residues have a chlorine content of up to 20% and above.

3. The process according to claim 1, wherein said chlorine-containing residues are filter dust and residues from a flue gas scrubber.

4. The process according to claim 1, wherein said total alkali to chlorine stoichiometric ratio is greater than 1.

5. The process according to claim 1, wherein said alkaline flux is an oxide, hydroxide, or carbonate of sodium or potassium, or a mixture thereof.

6. The process according to claim 1, further comprising drawing out at least 0.5 cubic meters, at standard temperature and pressure, of exhaust gas per kilogram of molten residue from a melting furnace.

7. The process according to claim 6, wherein at most 1 cubic meter of exhaust gas per kilogram of molten residue is drawn out from the melting furnace.

\* \* \* \* \*